United States Patent Office 3,554,697
Patented Jan. 12, 1971

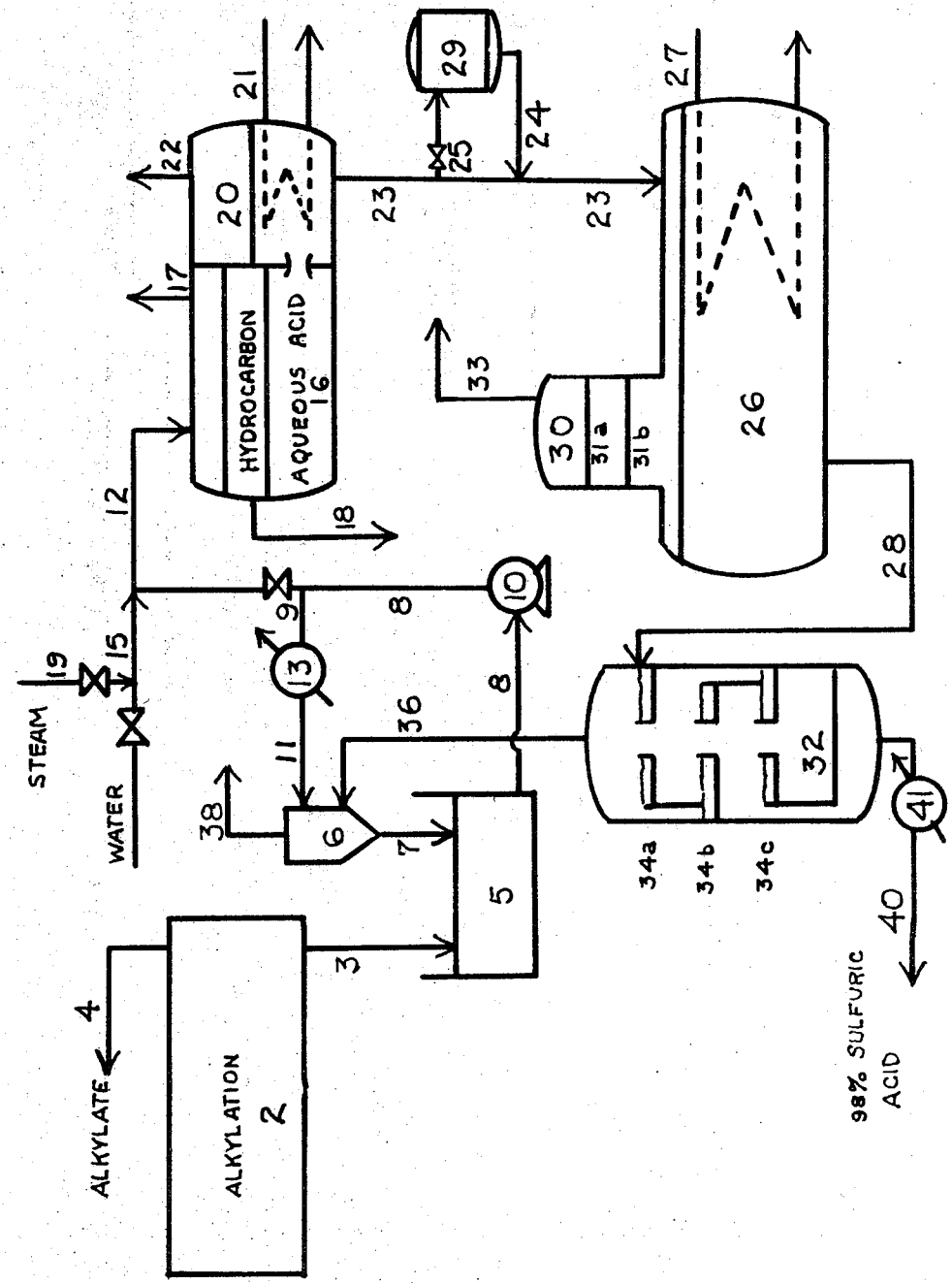

3,554,697
REDUCTION OF FOAMING DURING ACID REGENERATION
Walter E. Goers, Westchester, N.Y., assignor to Pullman Incorporated, Chicago, Ill., a corporation of Delaware
Filed Nov. 14, 1967, Ser. No. 687,087
Int. Cl. C01b 17/90
U.S. Cl. 23—173                                              11 Claims

ABSTRACT OF THE DISCLOSURE

The reconcentration of spent sulfuric of from 95 to 80 percent or lower concentration which involves diluting the acid to 65 percent or lower acid concentration; digesting the diluted acid in a first digestion zone under atmospheric pressure at a temperature of between 200° F. and 300° F. to form a hydrocarbon phase and an acid phase; settling the digested acid for a minimum period of 1.5 hours while maintaining the temperature of the first digestion zone; removing contaminants; passing the resulting acid to a second digestion zone wherein under atmospheric pressure and a temperature of between 300° F. and 400° F. the remaining hydrocarbons are decomposed to elemental carbon; settling the digested acid for a minimum period of 1.5 hours at the temperature in the second digestion zone; removing elemental carbon; and reconcentrating acid in one or a plurality of steps under vacuum up to an acid concentration of about 90 percent or higher which includes the step of continuously adding small amounts of dilute acid to a hot pool of concentrated acid and continuously removing from the hot pool approximately an equally small amount of acid which has been concentrated up to about 90 percent.

---

This invention relates to a method of purification and reconcentration of sulfuric acid up to at least 85 weight percent acid concentration. In one aspect this invention relates to purification and reconcentration of spent alkylation acid up to 90 to 98 weight percent acid concentration. In another particular aspect the invention relates to concentrating decontaminated sulfuric acid through the 80 to 85 weight percent concentration range while eliminating acid foaming.

Sulfuric acid alkylation is one of the major processes used by refineries for producing high octane components for gasoline. Fresh acid of 97 to 99.5 percent strength is normally charged to the alkylation reactor while acid of about 90 to 95 percent strength is withdrawn and is usually sent to a sulfuric acid plant where sulfur is recovered from the spent acid and sulfuric is manufactured from the recovered sulfur. The cost of providing concentrated acid for alkylation is an important component of the overall production cost because of the high purity and the relatively high proportion of this component required in an alkylation process. Heretofore, many processes have been proposed for removing hydrocarbon contamination and regenerating the recovered acid up to a concentration of about 92 to 93 percent. These processes include acid crystalization which is efficient but expensive and washing spent acid with various hydrocarbon solvents for decontamination followed by reconcentration by distillation. The latter process, however, cannot produce acid of sufficient concentration for use in alkylation, and, therefore, oleum is customarily added to fortify the reconcentrated acid. However, the economics of a reconcentration process to 92 percent sulfuric followed by fortification to 98 percent has no advantage over the manufacture of sulfuric acid from sulfur recovered from spent acid.

It is therefore an object of this invention to overcome the economic and operational difficulties mentioned above in connection with the prior processes of alkylation acid or sulfuric acid regeneration.

Another object of this invention is to provide a process for decontaminating and reconcentrating alkylation acid while eliminating foaming in the reconcentration step.

Another object of this invention is to provide a process by which a reconcentration of 98 percent sulfuric acid can be achieved.

Still another object of this invention is to provide a commercially feasible and economical method for producing alkylation acid from spent acid.

These and other objects of this invention will become apparent to one skilled in the art from the following description and disclosure.

According to this invention, spent sulfuric acid containing hydrocarbon contaminants having an acid concentration 95 percent or less is diluted with water to a concentration of 65 percent or lower concentration, for example to about 50 weight percent acid. The resulting water-acid mixture is then introduced into a digestion zone which is operated under from 1 to 15 atmospheres pressure at temperatures between about 175° F. and about 500° F., preferably under a pressure of from 1 to 5 atmospheres at a temperature of between 230° F. and 400° F. The digestion over a time interval of from 0.5 to 15 hours can be conducted with or without agitation to effect the separation of the hydrocarbon and other contaminants, for example, sulfates, sulfonates, esters, and hydrogen sulfide from the aqueous acid phase. Certain other gases such as carbon dioxide and sulfur dioxide can also be evolved during this treating stage. The digested acid is then allowed to settle for a minimum period of at least 0.5 hour at temperatures between 175° F. and 500° F., and the contaminant gases are vented to the atmosphere. A major portion of the hydrocarbons which separate as a liquid phase in this stage are decanted. During the digestion and settling stage, after the lighter hydrocarbon phase is separated from the heavier liquid acid phase, the remainder of the separable hydrocarbons are decomposed to oxides of sulfur which are vented and elemental carbon particles which can be immediately or subsequently removed from the process by settling, filtration, or by hydrocarbon entrainment as hereinafter described.

The digestion and settling stages have as their objective the reduction of the hydrocarbon contaminant level to at least 1 percent by weight and preferably to less than 0.5 percent by weight. It is necessary to achieve this hydrocarbon contaminant level since higher hydrocarbon concentrations lead to foaming and crusting in later stages of acid reconcentration. This foaming effect is particularly evident in concentrating the acid through the 80 to 85 percent acid range.

The severity and complexity of the digestion operation depends upon the degree of contamination of the acid fed to the digestion zone. For example, when the hydrocarbon contaminants are initially present in an amount less than 4 percent by weight, a simple one stage digestion at 175° F. to 250° F. under 1 to 5 atmospheres pressure is usually sufficient to reduce contaminant to the desired level. However, when the initial contaminant level is greater than about 4 percent by weight, it is recommended that the digestion be carried out under higher pressures and temperatures, for example a final temperature of 400° F. is beneficial in the digestion treatment when one or a plurality of digestion treatments is employed. In cases where contamination is excessive, it is desirable to carry out digestion in a plurality of stages; the first stage being effected at a relatively low temperature level, e.g., between 175° F. and 250° F., and the second or subsequent stages being effected at a higher temperature, e.g., between 250° F. and 500° F. The hydrocarbons can be decanted from the acid in each digestion stage or decantation can be omitted and the digested acid from one or more stages can then be passed to a common settling zone; however, it is preferable to employ a settling zone for each digestion stage and to separate contaminants and vent gaseous material from each settling zone at the temperature of the digestion stage which immediately precedes the settling. When the digestion is properly carried out in accordance with this teaching, up to about 99 percent of the contaminant hydrocarbon can be removed and the purified acid is recovered at an acid concentration of between 70 and about 80 percent.

The spent sulfuric acid from alkylation often contains about 5 to 7 percent by weight contaminant hydrocarbons and spent acid from treatment of hydrocarbon distillates may contain 10 to 15 percent hydrocarbons. A most preferred treatment for this highly contaminated acid involves dilution of the spent acid to about 60 percent by weight acid concentration, digesting the diluted acid with agitation from a stirrer or baffle for a period of from two to five hours at about 220° F. to 250° F. under from 1 to 3 atmospheres, settling the digested acid for about the same period of time at about the same temperature and then decanting hydrocarbons from the settled aqueous acid while venting vapors from the settling zone. The settled acid phase is then passed to a second digestion zone, wherein, under a pressure of from 1 to 3 atmospheres, preferably at a temperature higher than that employed in the first digestion zone, for example between 300° F. and 400° F., decomposition of the remaining hydrocarbon contaminants takes place over a similar time interval and the decomposition products are removed from the acid phase.

In the first digestion and settling stage up to 80 percent of the contaminants are removed and in the second digestion and settling stage up to 80 percent of the remaining hydrocarbon contaminants are decomposed and can be removed along with water vapor. The acid phase recovered from the single digestion and settling operation or from the plurality of digestion and settling operations is obtained in an acid concentration between 70 and 80 weight percent.

Elemental carbon is formed as a decomposition product of the hydrocarbon contaminants in the final digestion and settling operation. The carbon can be separated from the acid phase in the settling zone or immediately following the settling zone by known filtering techniques, for example by the use of a precoat filter device, by a centrifuge or by a vibrating settler or other devices. Alternatively, the carbon particles can be allowed to remain in the decontaminated acid, since carbon is not detrimental to the alkylation reaction. This carbon allowed to pass into the alkylator, however, is separated in the hydrocarbon phase from the digestion stage in a rerun of this acid regeneration process.

The above dilution and digestion operations are preferably carried out in a unitary vessel where the acid is passed to the various stages by gravitational flow. It is to be understood, however, that in cases where hydrocarbon contamination is unusually high, as in acid used in treating hydrocarbon distillates where contamination is between about 10 and about 15 percent, up to 5 or 6 digestion stages may be employed with temperatures gradually increasing from about 175° F. to about 500° F. and each stage can be carried out in a separate zone with or without separate settling zones between stages. The digested acid removed from the last digestion and settling zone is thus prepared for reconcentration.

Since foaming is most likely to occur in concentrating acid through 80 to 85 percent range, great care must be taken to avoid this source of acid loss. In accordance with the present process, the purified acid is continually passed in small amounts into a hot pool of concentrated acid having a weight percent acid concentration of from about 85 to about 90 percent or slightly higher and maintained under vacuum and at a temperature of between about 325° F. and about 450° F. The volume ratio of acid in the pool to added purified acid is between about 100:1 and about 10,000:1. The incrementally increased body of sulfuric acid in the hot pool causes a correspondingly small amount of concentrated liquid acid to be continuously generated from the pool of sulfuric at the same concentration as the hot acid. Although the hot pool of concentrated acid is employed in a minimum volume of at least 100:1 volume of acid in pool to volume of diluted acid being continuously introduced; the preferred minimum ratio is 200:1 and any amount in excess of 10,000:1 can be employed if desired. By the above method of concentration, only a very small percentage of the purified acid in the acid pool is concentrated through the foaming range at a given time and the proportionally large liquid body of pool acid inhibits uncontrolled foaming when concentrating the acid through the critical range. A small amount, e.g., not more than about 7 percent of sulfuric acid appears in the water vapor from the hot pool. This acid can be recovered by condensation in a trayed or packed column and returned to the pool while water vapor is carried to a vacuum system for maintaining the pressure in the concentration zone.

The operation of the hot pool concentration of the acid can be carried out in one or in a plurality of stages with separate hot acid pools of increasing concentration, for example, each having the same or decreasing vacuum with a pool of 85 weight percent acid under 75 mm. Hg and a second pool of 90 weight percent acid under 50 mm. Hg. Normally the acid pool is maintained under 25 to 150 mm. Hg, preferably 50 to 100 mm. Hg absolute pressure although a higher or lower vacuum can be employed if desired. In this manner the purified acid from the digestion stage or stages is concentrated up to between about 85 to 90 weight percent acid concentration. The concentration of the acid recovered from the hot pool of sulfuric is restricted to a concentration of not more than about 90 percent by weight acid in order to avoid the need for uneconomical recovery of the excessive amount of sulfuric which would accumulate in the vapor phase as the concentration of the liquid acid is increased.

The liquid acid of up to about 90 percent by weight acid concentration can be further concentrated up to 97 or 98 weight percent by passing sulfuric acid generated from the hot sulfuric acid pool through a final concentrating zone maintained under vacuum of between about 0.2 mm. Hg and 50 mm. Hg and at a higher vacuum than that of the hot pool concentrator. The final concentrator utilizes concentrated sulfuric acid in a barometric condenser for condensing vapors from a falling film evaporator or similar evaporating means in the final concentration. The final concentration zone can comprise a plurality of heat exchangers and flashing chambers operated in series, where the flash chambers are maintained under a higher vacuum than the hot pool concentrator, at a pressure of from 0.2 mm. Hg to 50 mm. Hg, but preferably from about 0.5 mm. Hg to about 8 mm. Hg. The acid to be further concentrated is passed downwardly in series through the successive heat exchanger and flashing zones maintained at a temperature between 300° F. and 450° F., preferably between 325° F. and 400° F. The vapors generated from the more concentrated acid in the lower portion of this zone contact weaker acid in the upper portion during its upward passage through the final concentration zone. Some of the acid in the more concentrated acid vapor is condensed as it passes countercurrent to the downwardly flowing weaker acid from the flashing zones above. In this manner, the amount of sulfuric acid in the vapor and the load on the recirculation of acid streams is kept at a minimum.

Various types of equipment can be employed for accomplishing the high vacuum concentration of sulfuric acid up to 98 weight percent acid concentration. For example, a plurality of climbing film, acid-resistant evaporators, e.g., glass lined evaporators, can be arranged in series for passage of the liquid acid therethrough; or a plurality of acid resistant pipes, e.g., steam jacketed glass lined pipes, can be employed for the high vacuum concentration. When using the latter arrangement, it is beneficial to employ a liquid acid bed of increasing depth and a vapor space of correspondingly decreasing volume over the bed in each succeeding pipe section.

A preferred arrangement of the high vacuum concentrator involves the use of a vertically sectional vessel, e.g., a four sectioned glass liner tower having three corrosion resistant plates, e.g., Teflon encapsulated steel plates which serve as evaporator trays for the liquid acid being concentrated. Each tray is heated, preferably by a tantalum pancake coil and is equipped with an acid overflow weir and a downcomer which passes acid overflowing the weir to the tray below. A vapor space is interposed between the trays and each tray contains a vapor opening, preferably a centrally located vapor opening in open communication with the vapor spaces maintained over the liquid acid contained on each tray to permit upward passage of generated vapors to the top vapor outlet of the high vacuum concentrator. The bottom of this vessel is utilized as an accumulation zone for concentrated acid prior to its removal. The acid depth on the trays is maintained at a level such that good heat transfer and uniform temperature conditions are realized. For example, the acid depth is advantageously maintained at about one inch to provide an optimum heat transfer coefficient.

In any of the above-described arrangements or in any other suitable high vacuum arrangements for concentrating acid, the condensation of vapors generated from the high vacuum concentrator is accomplished by the use of a liquid sulfuric acid medium. The effluent vapors from the final acid concentrator are condensed in a vapor-liquid contact type condenser using a recirculating stream of concentrated sulfuric acid, e.g., sulfuric acid at a concentration of between 70 and 90 weight percent, preferably in alkylation acid regeneration, between 82 and 87 weight percent as the condensing medium. The vapors from the final concentrator can be condensed in a spray type condenser using a recirculating stream of concentrated sulfuric acid and can be utilized in the important function of providing dilution of spent sulfuric acid from the alkylation zone or from another source since dilution is necessary for hydrocarbon decontamination and heating in the initial stages of regeneration. Total acid recovery is possible in the present process which provides for internal recycle of vapors from which the acid portion is ultimately recovered. The recirculating acid is preferably obtained from the partially diluted spent acid before digestion. The use of concentrated liquid sulfuric acid, in lieu of water, in the condenser permits the use of very high vacuum conditions (low absolute pressure) in the high vacuum concentrator. The correspondingly lower boiling point of sulfuric acid enables the use of convenient commercial materials of construction for the concentrator, heretofore not possible using principles of operation recommended by the prior art.

At the outlet of the final concentrating zone, sulfuric acid of about 97 to 98 percent by weight acid can be withdrawn, cooled and recovered. This acid is of a purity and concentration suitable for recycle to the alkylation or other hydrocarbon treating zone. In cases where a concentration of only 93 or 94 percent acid is required, the conditions for final concentration can be adjusted by lower temperature, to produce a concentration in this range. Alternatively, the liquid acid can be separately withdrawn from various trays at various concentrations.

For a better understanding of the present invention, reference is now had to the accompanying drawing which illustrates a specific embodiment of the process, but which is not to be construed in any way limiting to the scope of the invention.

In alkylation zone 2, isobutane is alkylated with butylene in the presence of sulfuric acid which enters the reaction zone at a concentration of about 98 percent by weight acid. When the alkylation reaction is completed, the spent acid is withdrawn from the alkylation zone by means of line 3 at a concentration of about 90 percent after separation by settling from the alkylate product mixture. The alkylate product mixture resulting from the reaction of the hydrocarbons at 60° F. under about 15 p.s.i.g. is separately withdrawn from the reaction zone by means of line 4 and treated in a known manner for purification and refinement of alkylate. In a normal operation, a portion of the spent acid in withdrawal line 3 can be recycled to the alkylation zone after fortification with concentrated acid. This fortification provides a sulfuric acid feed of about 97.5 percent to the alkylator.

To illustrate the process of the present invention, all of the spent sulfuric acid is regenerated to about 98 percent by weight acid concentration in the following manner. About 2,370 pounds per hour of 90 percent spent, hydrocarbon-contaminated sulfuric acid is withdrawn from alkylation zone 2 and passed to hot well 5 by means of line 3. The 90 percent acid contains about 4.0 percent hydrocarbon contaminants primarily in the form of sulfates and sulfonates, and about 6 percent water. In hot well 5, the spent acid is maintained at about 120° F. and the acid is diluted to 84.4 percent by condensed acid vapors from barometric condenser 6 as hereinafter described.

About 102,500 pounds per hour of recycle spent acid is pumped from hot well 5 by pump 10 through line 8 and into line 9 wherein it is cooled to about 110° F. by heat exchanger 13. The cooled spent acid from heat exchanger 13 is passed through line 11 to the barometric condenser wherein it acts as the condensing medium for about 558 pounds per hour of 52.4 percent sulfuric acid vapors entering the condenser at 334° F. from the final concentrator 32.

About 2,609 pounds per hour of the diluted 84.4 percent contaminated acid is pumped by pump 10 from hot well 5 through line 8 into valved line 12 and is further diluted to a concentration of 60 weight percent acid concentration in line 12 by means of water from line 15. While the heat of sulfuric acid dilution raises the temperature of the 60 percent sulfuric acid to about 230° F. the temperature is maintained by the addition of steam through valved line 19.

The dilute contaminated acid, is then introduced into digestion zone 16 at a rate of 4,098 pounds per hour, is allowed to settle in the digestion zone for a period of 2 hours at 230° F. Small amounts of sulfur dioxide generated in this zone are vented through line 17 and a lighter liquid hydrocarbon phase is separated in the settling portion of the digestion zone from a heavier aqueous sulfuric acid phase. The hydrocarbon phase is decanted from the acid by means of withdrawal line 18 at a rate of 130 pounds per hour. The resulting acid phase is then passed through a baffle in the lower portion of the settling section of the digestion zone and is introduced int second digestion zone 20 wherein at a temperature of 375° F. or slightly higher, maintained by means of indirect heat exchange with the steam in heating coil 21, a second gaseous phase comprising sulfur dioxide and water is formed by decomposition of the remaining hydrocarbons and is separated as a second gaseous phase from the remaining acid phase by vent line 22. This second gas phase is withdrawn at a rate of 879 pounds per hour. The resulting sulfuric acid obtained at an acid concentration of 76 weight percent, contains elemental carbon particles as a result of the hydrocarbon decomposition.

After settling for 2 hours, the 76 percent sulfuric acid is withdrawn from the settling section of the second digestion zone in line 23 from which a portion of it can be passed into line 24 and filter 29 for removal of the suspended elemental carbon which is formed during the second high temperature digestion step. However, if filtration is not desired, the acid containing the elemental carbon can by-pass the filter by closing the valve 25 in line 24 and can be directly introduced into the next treating stage by means of line 23. In the present example the elemental carbon is removed by filtration in precoat filter 29.

About 3,089 pounds per hour of filtered sulfuric acid is then introduced into a pool of hot 90 percent sulfuric contained in first evaporating zone 26 under a pressure of 60 mm. Hg at a temperature of about 365° F. maintained by means of indirect heat exchange with heating coil 27. However, it is to be understood that heat can be supplied by means other than steam, e.g., heat transfer oil or by electrical means. Line 23 can be valved to permit regulated flow of decontaminated acid into zone 26 at a rate of 1 volume per minute of decontaminated acid per 200 volumes of acid in the pool. A plurality of hot acid pools may be provided to avoid hold-up of acid in the settling section of the second digestion zone 20, or the size of the pool can be regulated to the rate of decontaminated acid fed to zone 26 to maintain the high ratio of acid in the pool.

The decontaminated acid is concentrated in zone 26 over a period of about 3.5 hours and an acid of 90 percent by weight acid concentration is withdrawn at a rate of 2,609 pounds per hour, i.e. at a rate equal to the rate at which decontaminated acid is introduced into zone 26. The aqueous vapors evaporated in zone 26 at a rate of 522 pounds per hour contain about 5.4 percent by weight acid. Essentially all of the acid in these vapors is condensed in zone 30 on trays 31a and 31b and returned to the pool of acid in zone 26. The resulting water vapor in zone 30 is passed to a vacuum system through line 33.

About 2,609 pounds per hour of the sulfuric acid which has been concentrated to about 90 percent in zone 26 is passed by means of line 28 into secondary evaporation zone 32 wherein the 90 percent acid is concentrated to 98 percent acid at a temperature of about 362° F., under a pressure of at least 50.0 mm. Hg, in this example under 5.0 mm. Hg. The final concentration under high vacuum is accomplished in final evaporation zone 32 by means of a series of evaporation stages provided by trays 34a, 34b, and 34c, each of which is heated by 250 p.s.i.g. steam. A vapor space is provided in the center of zone 32 in open communication with vapor spaces above the liquid acid on the trays to permit separation and upward passage of vapors evaporated from the descending acid liquid. The vapors separated on each of the trays become progressively higher in acid concentration; for example, 301 pounds per hour of aqueous 50.9 percent acid are vaporized from tray 34a, 172 pounds per hour of aqueous 73.9 percent acid are vaporized from tray 34b, and 85 pounds per hour of aqueous 84.3 percent acid are vaporized on tray 34c, so that the theoretical overall acid concentration of 558 pounds per hour of vapor removed from the top of zone 32 by means of vapor line would be about 62.4 weight percent acid concentration. However, because of the advantage gained in the use of the final evaporator of this example, namely the condensation of some of the acid in the highly concentrated acid vapors by contact with the weaker acid on the upper trays, the actual concentration of the 558 pounds per hour of vapor removed from zone 32 is only 52 weight percent. It is necessary to recover the acid from this vaporous effluent. Accordingly, the vaporous effluent is passed to sulfuric barometric condenser 6 by means of line 36, wherein the acid content of the gaseous effluent is condensed at a temperature of about 120° F. and under 4.6 mm. Hg by the partially diluted spent acid from hot well 5. About 14 pounds per hour of sulfur dioxide is removed from the top of barometric condenser 6 by means of line 38 and is passed to a vacuum system while condensate is employed to dilute spent acid in hot well 5.

The acid having been concentrated to 98 percent in zone 32 is passed into a retention zone in the bottom of zone 32 from which it is removed by means of line 40, passed through heat exchange cooler 41, and is recovered as 98 weight percent liquid sulfuric acid. The recovered acid can be cooled to alkylation temperature and returned to the alkylation zone if desired or it can be used in another process requiring a high sulfuric acid concentration at the temperature required by the process. It is to be understood that the spent acid trated in accordance with the above-description and the drawing can originate in a process other than alkylation for example in any acid treatment of hydrocarbon distillates.

Various other modifications of the above-described process will become apparent to one skilled in the art for example, a falling film evaporator can be used in place of evaporation zone 32 in the above drawing. Zone 30 can be a separate condensation zone, if desired, and zone 20 can be preceded by a plurality of digestion zones, each maintained at a lower temperature than the preceding zone. These and other modifications will become apparent from this disclosure.

Basically, the process involves dilution of hydrocarbon contaminated acid, digestion and settling of the contaminant acid at a suitable temperature, which temperature is dependent upon the concentration of contaminant in the acid and is most generally 50° greater than 175° F. for each percent concentration of contaminant greater than 1 percent. The purpose of digestion and settling is the formation of two liquid phases, a contaminant hydrocarbon phase and a liquid acid phase, the decomposition of the hydrocarbons, and the removal of the hydrocarbon phase for decontamination of the acid. Decontaminated acid can then be concentrated up to 90 percent under moderate vacuum by introduction into a hot pool of concentrated acid and can be further improved by evaporation under a high vacuum in a separate evaporating zone employing a sulfuric acid condenser.

Having thus described my invention, I claim:

1. In a process for decontaminating and concentrating hydrocarbon-contaminated sulfuric acid which includes the steps of diluting the contaminated acid, digesting and settling the dilute contaminated acid to form a hydrocarbon phase and an acid phase; separating these two phases; concentrating the decontaminated sulfuric acid in a concentrating zone; and recovering concentrated, decontaminated sulfuric acid from the concentrating zone, the improvement which comprises the steps in combination:

(1) diluting the contaminated acid to 65 weight percent acid concentration or less;
(2) under a pressure of up to 15 atmospheres, digesting the dilute acid and separating the resulting hydrocarbon phase until the contaminant level is reduced to at least 1 weight percent so as to produce a decontaminated, dilute acid phase of between about 70% and about 80% by weight acid;
(3) maintaining a pool of sulfuric acid of between 85 and 90 percent acid concentration under vacuum in the concentrating zone;
(4) introducing the dilute decontaminated acid phase of between about 70% and about 80% by weight acid into said acid pool in a volume ratio of between about 1:100 and about 1:10,000 volume of dilute acid to volumes of acid in the pool;
(5) vaporizing water from the decontaminated acid in the pool at a temperature of between about 300° F. and about 450° F. under a vacuum of at least 150 mm. Hg or higher;

(6) withdrawing the resulting water vapor from the hot pool concentrating zone; and (7) withdrawing concentrated, decontaminated sulfuric acid at an overall rate approximating that at which the decontaminated, dilute acid is introduced into said acid pool and at about the same concentration as the acid in the pool.

2. The process of claim 1 wherein the concentrated, decontaminated acid is passed to a second concentrating zone operated under a higher vacuum than that maintained in the first concentrating zone for further treatment to achieve a concentration of up to 98 percent acid concentration, and wherein said second concentrating zone comprises a plurality of separately defined flashing zones arranged in series for passage of liquid acid downwardly through each of said flashing zones, each flashing zone having a vapor space in open communication with the vapor space above to permit upward passage of vapors to the upper portion of said second concentrating zone, and wherein the concentrated, decontaminated sulfuric acid from the first concentrating zone is introduced into the upper portion of the second concentrating zone and water vapor is vaporized therefrom as it passes downwardly in said second concentrating zone at a temperature of between about 300° F. and about 450° F. under a vacuum of at least 50 mm. Hg but higher than that maintained in the acid pool; the resulting vapors from the lower flashing zones contact increasingly dilute acid as the vapors are passed upwardly in the second concentrating zone and sulfuric acid is continuously condensed from the rising vapors by contact with increasingly dilute acid and sulfuric acid having an acid concentration of up to 98 percent is withdrawn from said second concentrating zone.

3. The process of claim 1 wherein the temperature in the digestion zone is maintained at a level of about 50° in excess of 175° F. for each percent of contaminant in excess of 1 percent.

4. The process of claim 1 wherein a plurality of acid pool evaporating zones is employed in series, each having a higher acid concentration of from 85 to 91 percent by weight acid.

5. The process of claim 2 wherein the combined vapors are removed from the top of the second evaporating zone and are condensed in the barometric condenser which employs concentrated sulfuric acid as the condensing medium.

6. The process of claim 1 wherein the contaminant concentration of the dilute acid is greater than 4 percent and wherein the digestion and settling operations are carried out at a temperature between 250° F. and 500° F.

7. The process of claim 1 wherein hydrocarbon contamination of spent acid is higher than 4 weight percent, and a plurality of agitated digestion zones are employed in series, each having a substantially higher temperature than the preceding digestion zone to decompose additional hydrocarbon and wherein the acid is passed through said series of digestion zones before introduction into a common settling zone for separation of hydrocarbon and acid phases.

8. The process of claim 1 wherein a plurality of digestion and settling zones are employed in series, each digestion and settling zone being maintained at a substantially higher temperature than the preceding digestion and settling zone to decompose additional hydrocarbon and wherein hydrocarbon contaminant phase is separately withdrawn from the acid phase in each of the settling zones.

9. The process of claim 1 wherein the digested acid is passed through a filter for removal of elemental carbon before introduction of decontaminated acid into said hot pool evaporating zone.

10. The process of claim 2 wherein the acid liquid is separately removed from a plurality of trays of the second evaporating zone at varied concentrations between 92 and 98 percent.

11. The process for decontaminating and concentrating hydrocarbon contaminated sulfuric acid which comprises the steps in combination:

(1) diluting the contaminated sulfuric acid with water to an acid concentration of 65 percent or less;

(2) digesting the diluted contaminated acid for a period of from 0.5 to 15 hours at a temperature of between 220° F. and about 250° F. under from 1 to 15 atmospheres;

(3) settling the digested mixture for a period of at least 0.5 hour to form a liquid hydrocarbon phase and a liquid acid phase and withdrawing the hydrocarbon phase from the settling zone;

(4) passing the resulting acid phase to one or more digesting zones operated at a substantially higher temperature than the first digesting zone, such as between about 300° F. and about 400° F. and digesting the acid phase for a period of at least 0.5 hour to decompose hydrocarbon remaining in the acid phase;

(5) settling the mixture from the digesting stage of step (4) for a period of at least 0.5 hour to form a second liquid hydrocarbon phase and a second liquid acid phase and withdrawing said second liquid hydrocarbon phase to reduce the hydrocarbon concentration in the acid to not more than 0.5 percent by weight;

(6) passing the decontaminated acid into a pool of 85 to 90 percent sulfuric acid in a volume ratio of between 1:100 and about 1:10,000 volume of dilute acid to volumes of acid in the pool;

(7) maintaining the acid pool under a vacuum of from 50 mm. Hg to 100 mm. Hg and a temperature of from about 300° F. to about 450° F.;

(8) evaporating water from the decontaminated acid in the acid pool concentrating zone and withdrawing said water vapor from said zone;

(9) withdrawing concentrated, decontaminated sulfuric acid from said acid pool concentrating zone at a rate approximating that at which the dilute decontaminated acid is introduced into said acid pool and at a concentration substantially the same as that of the acid in the pool;

(10) passing said concentrated, decontaminated acid to a second concentrating zone maintained under a higher vacuum than that of the acid pool and at least 50 mm. Hg; and

(11) further concentrating the concentrated acid of not more than about 90 weight percent acid concentration in the second concentrating zone by flashing to cause evaporation of vapors and recovering a sulfuric acid having an acid concentration of up to 98 percent from said second concentrating zone as the product of the process.

References Cited

UNITED STATES PATENTS

| | | | |
|---|---|---|---|
| 3,333,019 | 7/1967 | Nathan et al. | 23—172X |
| 2,441,521 | 5/1948 | Van Der Valk et al. | 23—173 |
| 2,418,210 | 4/1947 | Wilde | 23—173 |
| 2,078,088 | 4/1937 | Mantius et al. | 23—172X |
| 1,384,978 | 7/1921 | Simonson et al. | 23—173 |

OTHER REFERENCES

Perry, Chem. Engrs. Handbook, 4th ed. (McGraw-Hill 1963) (sect. 18, pp. 3–7).

Perry, Chem. Engrs. Handbook, sect. 11; pp. 38–40 (4th ed. 1963, McGraw-Hill).

OSCAR R. VERTIZ, Primary Examiner

C. B. RODMAN, Assistant Examiner

U.S. Cl. X.R.

23—306